United States Patent [19]
Zoromski

[11] Patent Number: 5,269,642
[45] Date of Patent: Dec. 14, 1993

[54] CONTAINER LOADING AND UNLOADING SYSTEM

[75] Inventor: Gerald E. Zoromski, Schofield, Wis.

[73] Assignee: Sport-Cam Industry, Inc., Schofield, Wis.

[21] Appl. No.: 44,876

[22] Filed: Apr. 7, 1993

Related U.S. Application Data

[63] Continuation of Ser. No. 776,576, Oct. 15, 1991, abandoned.

[51] Int. Cl.⁵ ............................................. B65G 67/02
[52] U.S. Cl. .................................. 414/392; 254/279; 414/400; 414/500
[58] Field of Search ............... 414/500, 559, 400, 392, 414/393, 462; 254/279

[56] References Cited

U.S. PATENT DOCUMENTS

| | | | |
|---|---|---|---|
| 1,730,480 | 10/1929 | Shirreff | 414/500 X |
| 1,885,399 | 11/1932 | Wren | 414/500 X |
| 2,580,501 | 1/1952 | Anderson et al. | 414/500 |
| 2,676,720 | 4/1954 | Noble | 414/462 |
| 2,931,528 | 4/1960 | Mabry | 414/462 |
| 2,982,431 | 5/1961 | Moody | 414/462 |
| 3,081,894 | 3/1963 | Osgood | 414/500 |
| 3,159,295 | 12/1964 | Love | 414/500 X |
| 3,197,054 | 7/1965 | Settem | 414/500 |
| 3,262,591 | 7/1966 | Aldropp | 414/500 |
| 3,411,646 | 11/1968 | Emery et al. | 414/500 |
| 3,495,729 | 2/1970 | Kruse | 414/462 |
| 3,531,006 | 9/1970 | Farchmin | 414/462 |
| 3,684,112 | 8/1972 | Wijers | 414/500 |
| 3,695,472 | 10/1972 | Rasmussen | 414/500 |
| 3,804,275 | 4/1974 | Lee | 414/500 X |
| 3,883,020 | 5/1975 | Dehn | 414/498 |
| 3,894,643 | 7/1975 | Wilson | 414/462 |
| 3,976,213 | 8/1976 | Ball | 414/462 |
| 4,082,195 | 4/1978 | Wnek | 414/500 X |
| 4,225,281 | 9/1980 | Bibeau et al. | 414/498 |
| 4,645,406 | 2/1987 | Cooper et al. | 414/500 |
| 4,913,614 | 4/1990 | O'Rarden | 414/500 X |
| 4,975,019 | 12/1990 | Cate et al. | 414/500 X |
| 4,986,719 | 1/1991 | Galbreath | 414/500 X |

FOREIGN PATENT DOCUMENTS 9008052  7/1990  PCT Int'l Appl. .................. 414/500

*Primary Examiner*—David A. Bucci
*Attorney, Agent, or Firm*—Andrus, Sceales, Starke & Sawall

[57] ABSTRACT

The container loading and unloading system includes a first set of cables attached to the front of the container, a second set of cables attached to the rear of the container, a winch for alternately extending and retracting the cables by rotating a cross bar, a pair of substantially parallel rails for supporting the bottom of the container, a pivot bar located between and normal to both rails, and a yoke for supporting the pivot bar. To load the container—which may be a camper, a cargo box or a tool box—a cross bar is rotated in a first direction to extend the first set of cables and to retract the second set of cables, thereby pulling the container along the rail members onto a raised surface. The rails pivot along with the container on the pivot bar to assist in the loading operation. To unload the container, the cross bar is rotated in the opposite direction to retract the first set of cables and to extend the second set of cables, with the rails again pivoting about the pivot bar to lower the container onto the ground.

29 Claims, 4 Drawing Sheets

CONTAINER LOADING AND UNLOADING SYSTEM

This application is a continuation of Ser. No 07/776,576 filed Oct. 15, 1991, now abandoned.

BACKGROUND OF THE INVENTION

This invention relates to devices for loading and unloading containers, and more particularly to a winch-operated mechanism for loading campers, tool boxes, cargo boxes and the like onto a truck bed.

It is often desirable to load campers, tool boxes, or other heavy containers onto the bed of a motor vehicle or onto another raised surface. It is also desirable to subsequently unload the heavy container from the truck bed or other raised surface.

One common way of loading a heavy container onto a truck bed is to have two or more strong people manually lift the container off the ground onto the truck bed. This procedure is laborious, requires at least two people, and may result in injury to the people or damage to the container.

Due to the shortcomings of the manual procedure, several attempts have been made to provide winch-operated mechanisms to load boats, luggage carriers, or other items onto a truck bed or the top of an automobile. These devices are typically very complicated and expensive, and still require the rather strenuous cranking of a hand-operated winch.

Therefore, it is desirable to provide a simple, easily-operated device for loading heavy containers onto a truck bed or another raised surface.

SUMMARY OF THE INVENTION

An apparatus is disclosed that positions or loads a container such as a camper, cargo box or a tool box onto a raised surface such as a truck bed. The apparatus also removes or unloads the container from the raised surface and lowers it onto a lower surface such as the ground.

The apparatus includes a first cable means consisting of at least one cable interconnected with a front portion of the container, and a second cable means including at least one cable interconnected with a rear portion of the container. The apparatus also includes a winch means having a rotatable cross bar interconnected with the first cable means and with the second cable means, and a means for rotating the cross bar that preferably includes a remote control. Upon actuation of the remote control, the cross bar rotates in a first direction to extend the first cable means and to retract the second cable means to position or load the container onto the raised surface.

To unload or remove the container from the raised surface, the remote control rotates the rotatable cross bar in a second, opposite direction which causes the first cable means to be retracted and the second cable means to be extended.

In a preferred embodiment, the apparatus also includes a rail means consisting of a pair of two substantially parallel rail members for supporting the container while the container is being positioned onto or removed from the raised surface. The bottom of the container preferably includes a means for receiving the rail members to allow the container to easily slide along the rails.

The preferred embodiment also includes a pivot means interconnected with the rail means for pivoting the rails about a pivot axis while the container is being positioned onto or removed from the raised surface. The pivot axis is preferably substantially normal to the two parallel rail members. If the raised surface is on a motor vehicle, the pivot means is supported by a yoke means that is interconnected with the rear bumper of the motor vehicle.

It is a feature and advantage of the present invention to provide a system for loading and unloading heavy containers that is easily operated by a single person without any significant manual effort.

It is another feature and advantage of the present invention to provide a container loading and unloading system that is simple and inexpensive.

These and other features and advantages of the present invention will be apparent to those skilled in the art from the following detailed description of a preferred embodiment and the drawings, in which:

DETAILED DESCRIPTION OF THE PREFERRED EMBODIMENT

Figure 1:
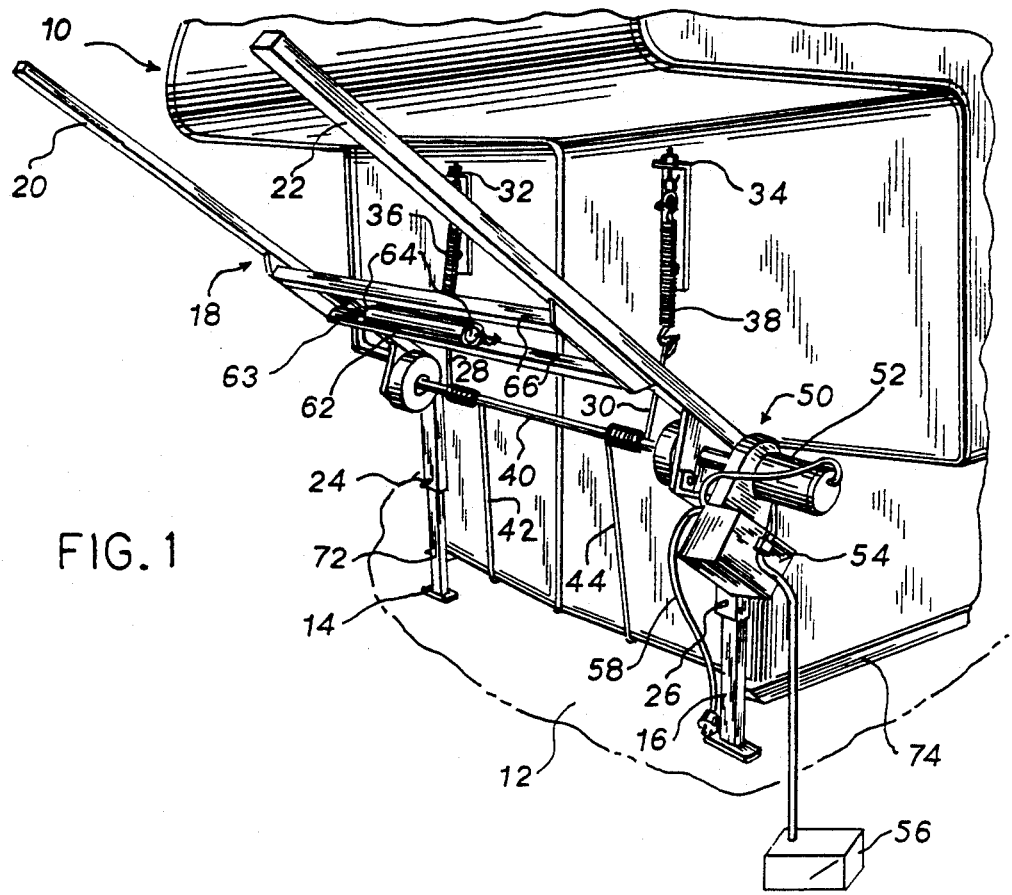
FIG. 1 is a perspective view of the system according to the present invention attached to a camper.

FIG. 1 is a perspective view of the loading and unloading system attached to a camper. In FIG. 1, camper 10 is held slightly off of the ground 12 by extendable, slide bars 14 and 16 of the loading and unloading system 18. Slide bars 14 and 16 are received in the ends of two parallel rail members 20 and 22 respectively, and are retained in the desired position by quick disconnect pins 24 and 26. Slide bars 14 and 16 each have a plurality of holes therethrough to enable their heights to be adjusted. The desired heights of the slide bars should be sufficient to keep camper 10 off of ground 12, and are also determined by the height of the truck bed or other raised surface onto which the camper or other container is to be loaded. The slide bars should be sufficiently extended so that they support the weight of the container while it is being loaded.

System 18 also includes a first pair of spaced, non-parallel cables 28 and 30, which are attached to the front of camper 10 via brackets 32 and 34 respectively. The front ends of cables 28 and 30 are attached to brackets 32 and 34 via intervening springs 36 and 38. The purpose of springs 36 and 38 is to take up slack in their respective cables that may occur when the rotational direction of the winch is being changed.

The opposite ends of cables 28 and 30 are attached to a rotatable cross bar 40 that is substantially perpendicular to parallel rails 20 and 22. As cross bar 40 rotates, cables 28 and 30 are either rolled onto or unrolled from bar 40, depending upon the direction of the rotation.

Figure 7:
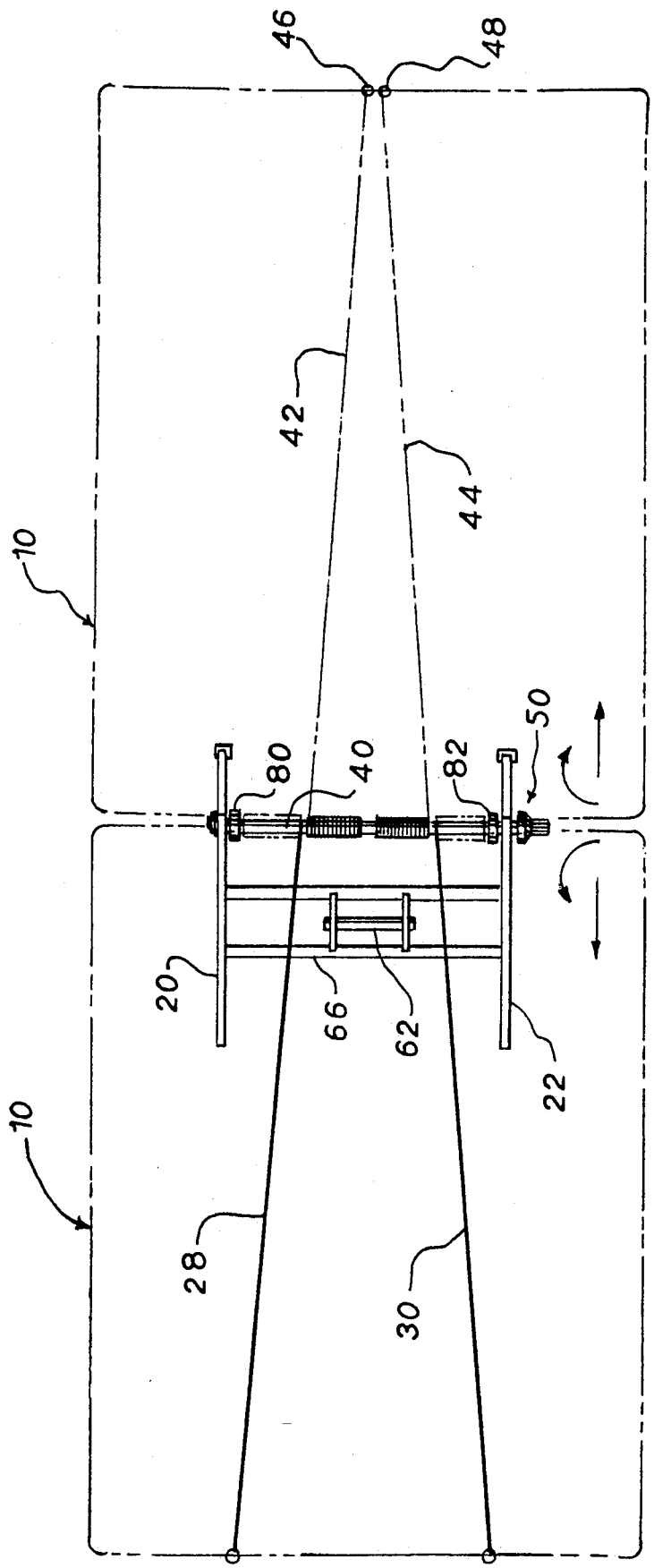
FIG. 7 is a top diagrammatical view of the loading and unloading system according to the present invention.

System 18 also includes a second pair of non-parallel cables 42 and 44. An end of each of cables 42 and 44 is attached to a rear portion of camper 10 at points 46 and 48, respectively, as depicted in FIG. 7.

The opposite ends of cables 42 and 44 are attached to rotatable cross bar 40. Cables 42 and 44 are rolled onto cross bar 40 during the loading process as bar 40 is rotated in the counterclockwise direction. Cables 42 and 44 are unrolled or extended from the cross bar during the unloading process as the cross bar is rotated in the clockwise direction. See FIG. 7.

In FIG. 1, winch 50 includes rotatable cross bar 40, and a means for rotating the cross bar including a motor 52, a motor controller 54, a remote control 56 interconnected with controller 54, and a power cable 58 that is interconnected with the truck battery (not shown) to provide power for the winch. The winch is preferably a model X-1 winch available from Super Winch Company of Philadelphia, Pa.

System 18 also includes a pivot means 60 that comprises a pivot bar 62, a first pair of support bars 64, and a second pair of support bars 66. As discussed more fully below, pivot bar 62 is received in a yoke 68 (FIG. 2) attached to a rear bumper 70 of motor vehicle 71. As the camper is being loaded or unloaded, rails 20 and 22 and the camper pivot about longitudinal axis 63 of pivot bar 62. Support bars 64 and 66, pivot bar 62, and yoke 68 support the weight of the camper while it is being pivoted.

The present invention may be used with standard campers, as long as cables 28 and 30 may be attached to the front portion of the camper, cables 42 and 44 may be attached to the rear portion of the camper, and a means is provided on the bottom portion of the camper for guiding the camper along rails 20 and 22. If a standard camper is used, this guide means preferably includes two parallel wooden guide members 72 and 74. If a custom camper is designed for use with system 18, guides 72 and 74 may be formed as indentations in the bottom surface of camper 10.

Although the present invention may be used with standard campers having an extended forward sleeping compartment, in that event the camper should be raised further off the ground than if a camper is used without the extended forward sleeping compartment. This addition height is needed to allow the forward portion of the camper to clear rails 20 and 22 during the loading and unloading process.

Figure 2:
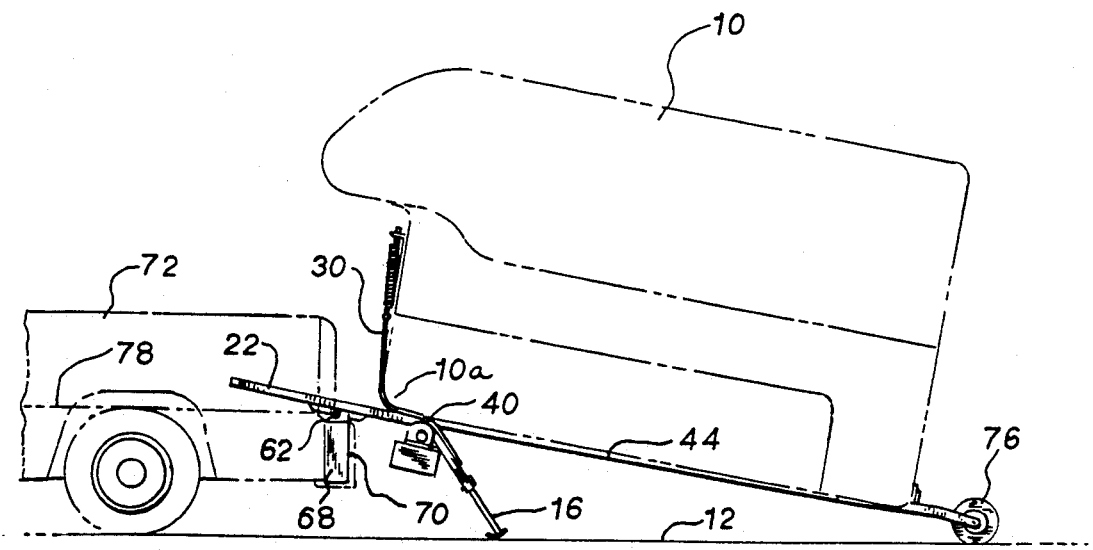
FIG. 2 is a side view of the camper of FIG. 1 having been lifted onto the rail means of the present invention.

As best shown in FIG. 2, a pair of wheels 76 are interconnected with the rear portion of the camper to prevent the camper from touching the ground during the loading or unloading process.

Figure 3:
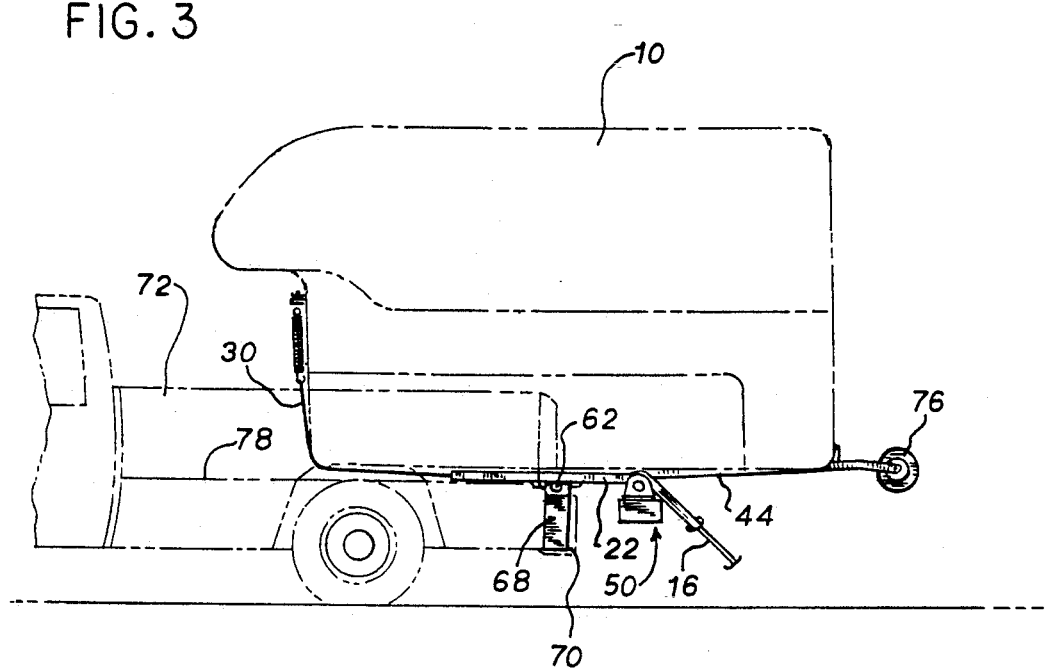
FIG. 3 is a side view of the camper having been partially positioned on the truck bed.
Figure 4:
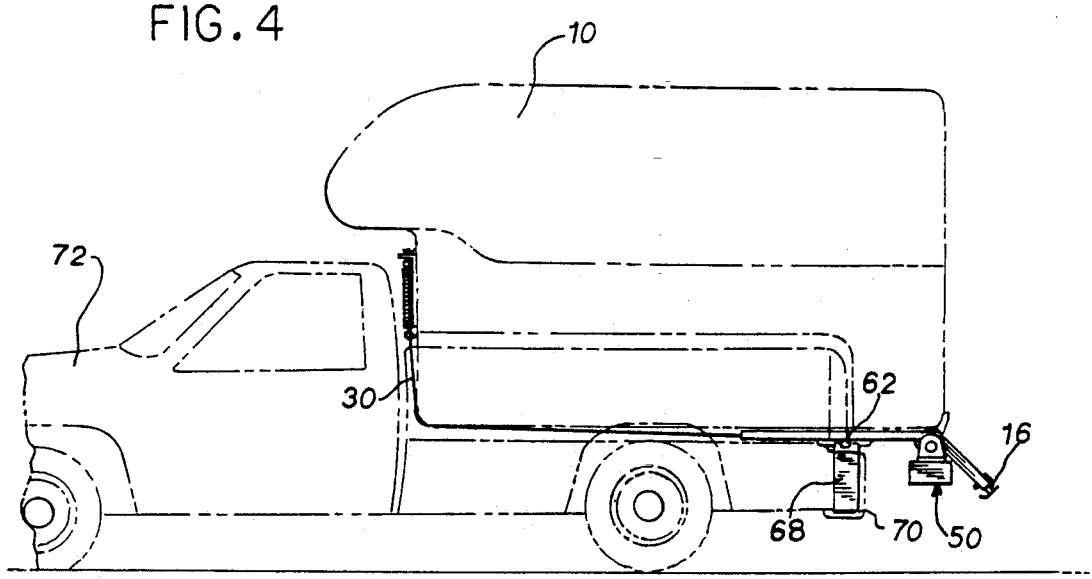
FIG. 4 is a side view of the camper in its completely loaded position.

FIGS. 2 through 4 depict the camper being loaded on the bed of a pick-up truck 71. FIG. 2 depicts a camper 10 having already been raised so that the front lower corner 10a of the camper has already passed over cross bar 40. The forward ends of rails 20 and 22 are raised from truck bed 78, while slide bars 14 and 16 still touch ground 12. Since the winch is being operated in the counterclockwise direction during loading, cables 28 and 30 are being extended while cables 42 and 44 are being retracted or rolled onto cross bar 40. The rolling of cables 42 and 44 onto the cross bar pulls camper 10 in a forward direction onto the motor vehicle bed.

The camper then continues to move in a forward direction until pivot bar 62 moves downward to rest in yoke 68. The camper then pivots about pivot axis 63 of pivot bar 62. At this stage in the loading process, as depicted in FIG. 3, rails 20 and 22 also pivot so that their front ends are now lying on truck bed 78. The weight of the loading system and the camper is borne by the pivot means and by yoke 68, which is attached to rear bumper 70 of motor vehicle 71. Cables 28 and 30 continue to be extended, while cables 42 and 44 are rolled onto the cross bar to pull the camper in the forward direction. Due to the pivoting of the rail members, slide bars 14 and 16 are now raised off the ground, as are wheels 76.

To complete the loading process, winch 50 continues to rotate cross bar 40 in the counterclockwise direction until camper 10 is in its completely loaded position, as depicted in FIG. 4. Cables 28 and 30 are then fully extended, and cables 42 and 44 are fully retracted. The loading and unloading system remains connected to camper 10 so that it may be used during the unloading process.

To unload the camper from the truck, the winch is operated in reverse so that cross bar 40 is rotated in the clockwise direction. Cables 28 and 30 (FIG. 1) are then retracted or rolled onto the cross bar, while cables 42 and 44 are extended. The rolling of cables 28 and 30 onto cross bar 40 effectively pulls the camper toward the cross bar and off of the truck bed.

When the camper is partially removed from the truck bed, it pivots about pivot bar 62 and its pivot axis 63 so that the forward ends of rails 20 and 22 are raised into the air and slide members 14 and 16 engage the ground. Continued operation of the winch together with the force due to gravity enable the camper to be slowly unloaded from the truck bed.

FIG. 7 is a top diagrammatic view of the loader/unloader system which more clearly depicts the orientation of the first pair of cables 28 and 30, and the non-parallel cables 42 and 44. The lefthand side of FIG. 7 depicts the camper in the forward or loaded position. As shown on the lefthand side, cables 28 and 30 are fully extended in this position, and are not parallel to enable them to be properly rolled onto cross bar 40. As shown by the arrows on the lefthand side of FIG. 7, the winch is operated in the counterclockwise direction while the camper is moving forward or to the left in FIG. 7.

The righthand portion of FIG. 7 depicts the camper in its fully unloaded position. Cables 42 and 44 are then fully extended, with cables 28 and 30 being rolled onto the cross bar, as depicted in phantom on cross bar 40. Rollers 80 and 82 prevent cables 28 and 30 respectively from rubbing up against rails 20 and 22 while the cables are being wrapped onto cross bar 40. As depicted by the arrows on the right hand side of FIG. 7, rotation of the cross bar in the clockwise direction causes the camper to move to the right or away from the truck bed.

Figure 5:
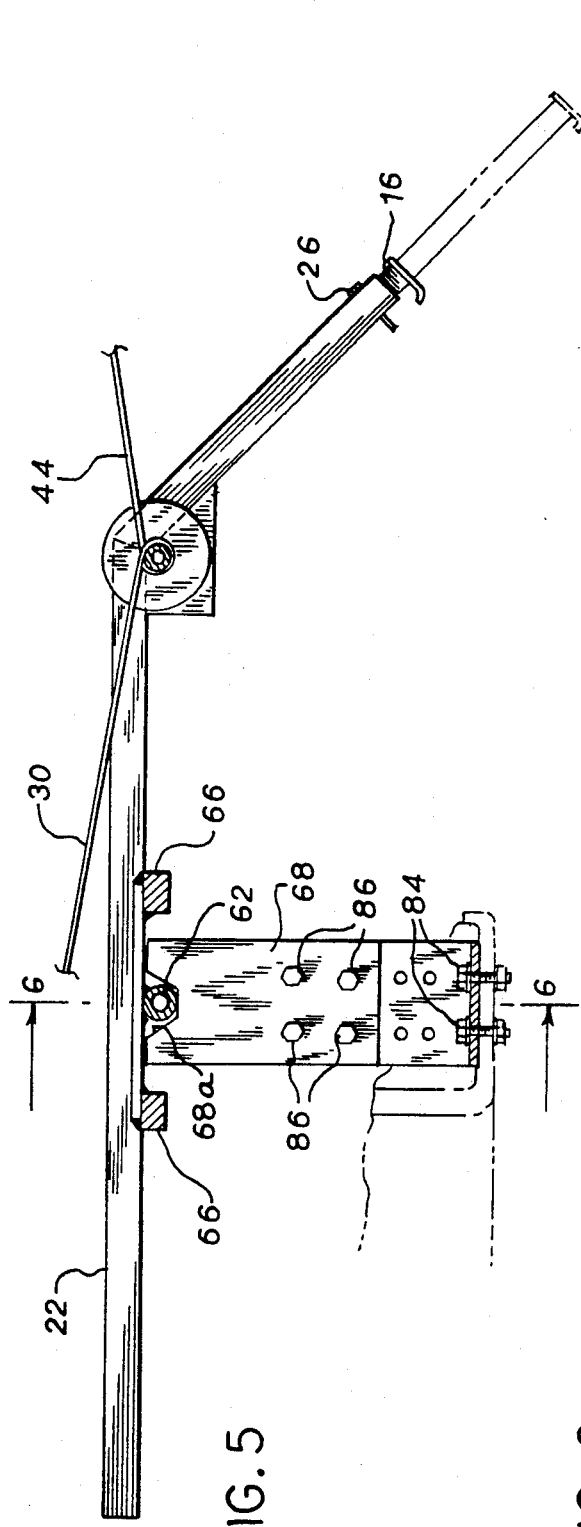
FIG. 5 is a side view of the loading/unloading system according to the present invention.
Figure 6:
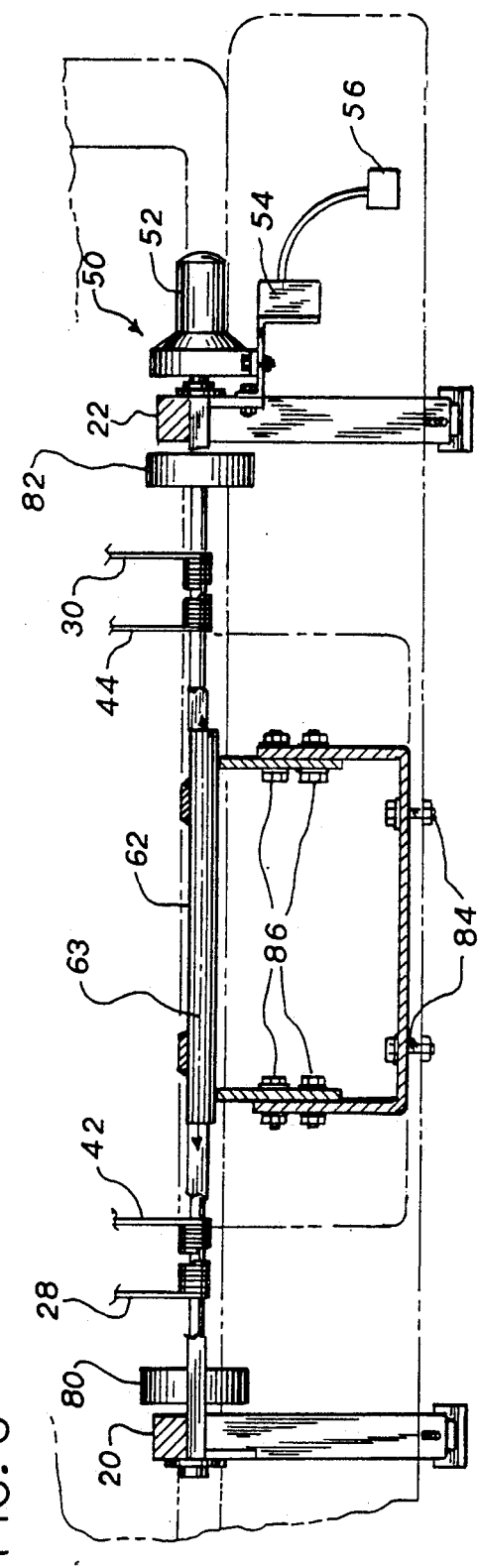
FIG. 6 is a front cross-sectional view of the system of FIG. 5, taken along line 6—6.

FIGS. 5 and 6 more clearly depict the pivot bar and yoke according to the present invention. FIG. 5 is a side view of the loading and unloading system, shown in partial section. FIG. 6 is a cross-sectional view of the loading and unloading system of FIG. 5, taken along line 6—6. As shown in FIG. 5, pivot bar 62 rests in a recess 68a of yoke 68. Yoke 68 is attached to the rear bumper of the truck via bolt and nut assemblies 84. The bolts preferably pass through the two safety chain holes in the step bumper portion of the rear bumper, so that no additional holes are needed in the bumper. As shown in FIG. 6, the height of yoke 68 may be adjusted via bolt and nut assemblies 86. The height of the yoke is adjusted so that pivot bar 62 clears the upper end of the step bumper.

Although a preferred embodiment of the present invention has been shown and described, alternate embodiments will be apparent to those skilled in the art and are within the intended scope of the present invention. Therefore, the invention is to be limited only by the following claims.

I claim:

1. Apparatus that positions a container onto a surface and that removes the container from the surface, comprising:
    first cable means interconnected with the container;
    second cable means interconnected with the container;
    winch means, including a single rotatable cross member, for extending said first cable means and for simultaneously retracting said second cable means to position said container onto said surface when said cross member is rotated in a first direction, and for retracting said first cable means and for simultaneously extending said second cable means to remove said container from said surface when said cross member is rotated in a second direction opposite to said first direction, said single rotatable cross member being the only cross member engaged by said first cable means and said second cable means.

2. The apparatus of claim 1, wherein said first cable means includes a pair of spaced, non-parallel cables.

3. The apparatus of claim 1, wherein said first cable means is interconnected with a front portion of said container.

4. The apparatus of claim 1, wherein said second cable means includes a pair of spaced, non-parallel cables.

5. The apparatus of claim 1, wherein said second cable means is interconnected with a rear portion of said container.

6. The apparatus of claim 1, wherein said rotatable cross member is interconnected with said first cable means and with said second cable means; and
    wherein said winch means includes:
    means for rotating said cross member.

7. The apparatus of claim 6, wherein said rotating means includes a remote control.

8. The apparatus of claim 1, further comprising:
    rail means for supporting said container while the container is being positioned on said surface.

9. The apparatus of claim 8, wherein said rail means includes two substantially parallel rail members.

10. The apparatus of claim 8, wherein a bottom portion of said container includes a means for receiving said rail means.

11. The apparatus of claim 8, further comprising:
    pivot means interconnected with said rail means for pivoting said rail means about a pivot axis while the container is being positioned on said surface.

12. The apparatus of claim 11, wherein said pivot axis is substantially normal to said rail means.

13. Apparatus that loads a container onto a motor vehicle, and that unloads a container from a motor vehicle, comprising:
    first cable means interconnected with the container;
    second cable means interconnected with the container;
    winch means, including a single rotatable cross member, for extending said first cable means and for simultaneously retracting said second cable means to load said container onto said motor vehicle when said cross member is rotated in a first direction, and for retracting said first cable means and for simultaneously extending said second cable means to unload said container from said motor vehicle when said cross member is rotated in a second direction opposite to said first direction, said single rotatable cross member being the only cross member engaged by said first cable means and said second cable means.

14. The apparatus of claim 13, wherein said first cable means includes a pair of spaced non-parallel cables.

15. The apparatus of claim 13, wherein said second cable means includes a pair of spaced non-parallel cables.

16. The apparatus of claim 13, wherein said first cable means is interconnected with a front portion of said container, and wherein said second cable means is interconnected with a rear portion of said container.

17. The apparatus of claim 13, wherein said rotatable cross member is interconnected with said first cable means and with said second cable means; and
    wherein said winch means includes:
    means for rotating said cross member in a first direction during the loading of said container and in a second direction during the unloading of said container.

18. The apparatus of claim 17, wherein said rotating means includes a remote control.

19. The apparatus of claim 17, wherein said rotating means is electrically powered by the motor vehicle.

20. The apparatus of claim 13, further comprising:
    rail means for slideably engaging said container while said container is being loaded onto the motor vehicle.

21. The apparatus of claim 20, wherein said rail means includes at least one extendable slide bar.

22. The apparatus of claim 20, wherein said rail means includes two substantially parallel rail members.

23. The apparatus of claim 20, further comprising:
    pivot means interconnected with said rail means for pivoting said rail means while the container is being loaded onto said motor vehicle.

24. The apparatus of claim 23, wherein said pivot means includes a pivot bar that is substantially normal to said rail means.

25. The apparatus of claim 23, further comprising:
    yoke means interconnected with said motor vehicle for supporting said pivot means.

26. The apparatus of claim 25, wherein said yoke means is affixed to a rear bumper of said motor vehicle.

27. The apparatus of claim 13, wherein said container is a camper and said motor vehicle is a pick-up truck.

28. The apparatus of claim 13, wherein said container is a tool box.

29. The apparatus of claim 13, wherein said container is a cargo box.

* * * * *